No. 771,405. PATENTED OCT. 4, 1904.
G. W. WHITTINGTON.
FENCE REEL.
APPLICATION FILED JULY 25, 1902. RENEWED AUG. 29, 1904.
NO MODEL. 2 SHEETS—SHEET 1.
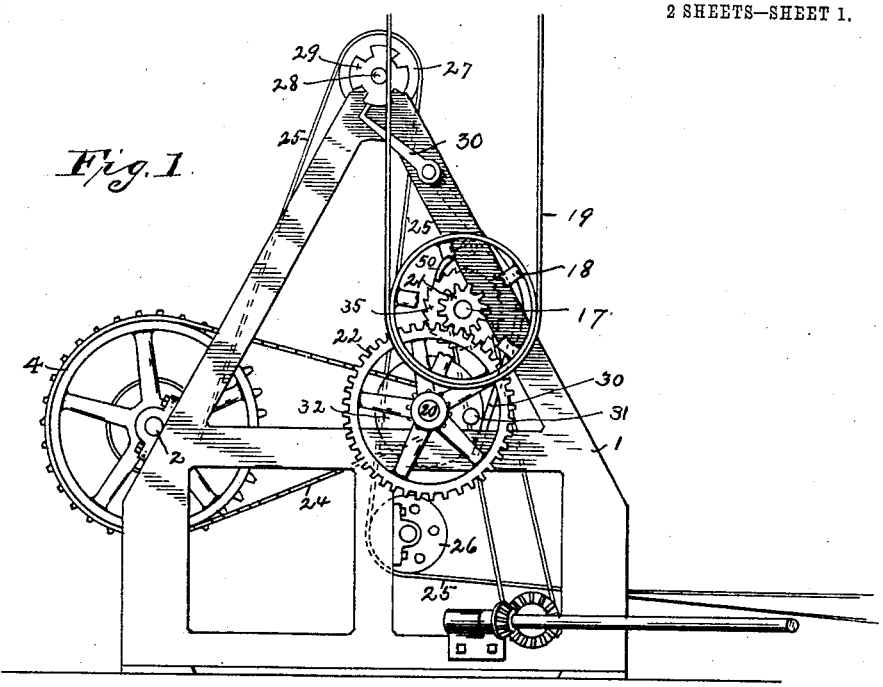
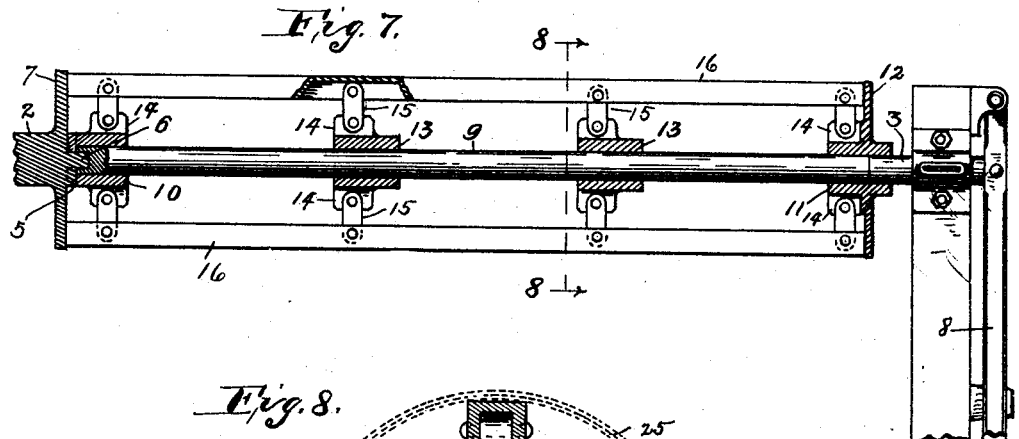
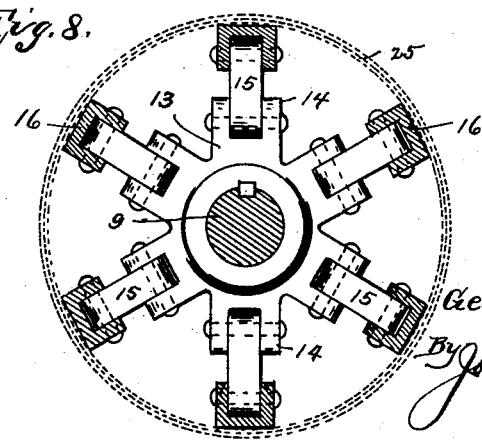
Witnesses,
S. Mahlon Unger.
John B. Sherwood.
Inventor,
George W. Whittington,
By Joseph A. Minturn,
Attorney.

No. 771,405. PATENTED OCT. 4, 1904.
G. W. WHITTINGTON.
FENCE REEL.
APPLICATION FILED JULY 25, 1902. RENEWED AUG. 29, 1904.
NO MODEL. 2 SHEETS—SHEET 2.
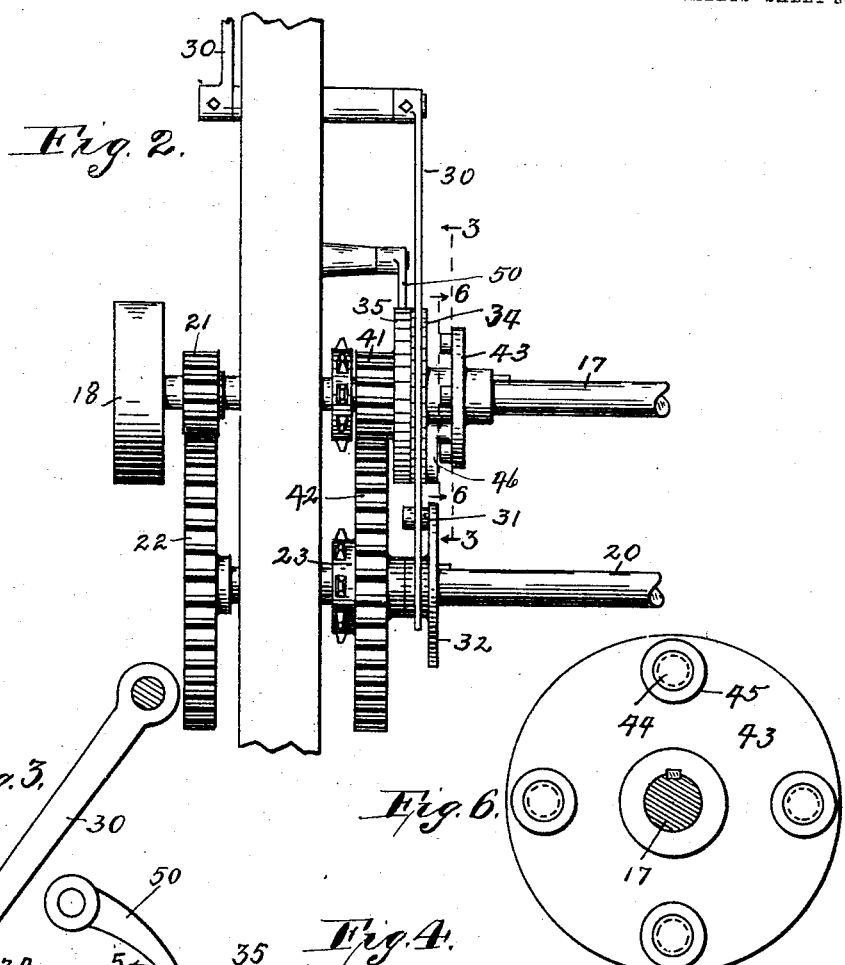
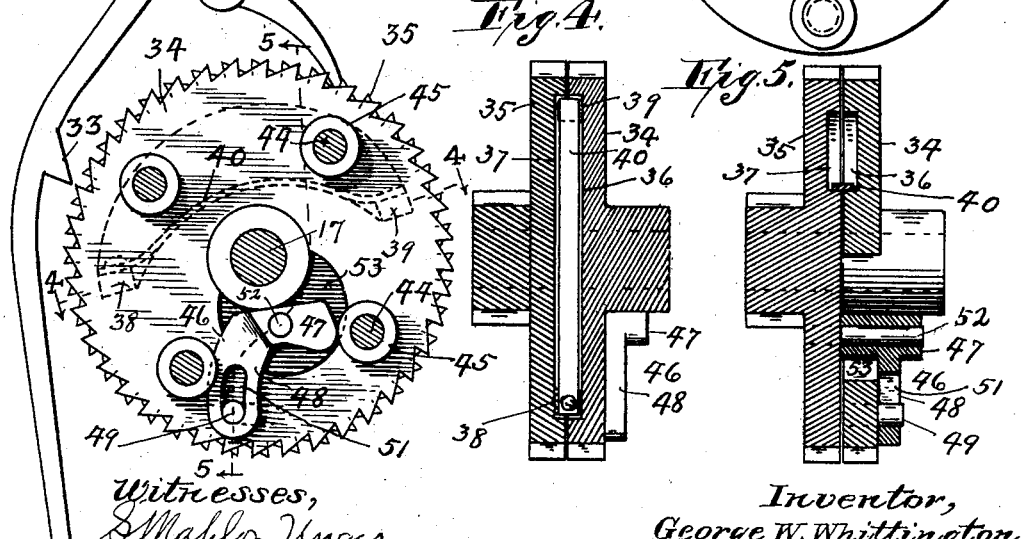
Witnesses,
S. Mahlon Unger.
John B. Sherwood
Inventor,
George W. Whittington.
By Joseph A. Minturn,
Attorney.

No. 771,405.

Patented October 4, 1904.

UNITED STATES PATENT OFFICE.

GEORGE W. WHITTINGTON, OF INDIANAPOLIS, INDIANA.

FENCE-REEL.

SPECIFICATION forming part of Letters Patent No. 771,405, dated October 4, 1904.

Application filed July 25, 1902. Renewed August 29, 1904. Serial No. 222,607. (No model.)

*To all whom it may concern:*

Be it known that I, GEORGE W. WHITTINGTON, a citizen of the United States, residing at Indianapolis, in the county of Marion and State of Indiana, have invented certain new and useful Improvements in Fence-Reels, of which the following is a specification.

This invention relates to improvements in machines for weaving wire-fencing material; and the object of the invention is to provide a drum on which the finished product is wound which can be reduced in diameter to permit of the easy removal of the roll of fencing when finished.

The further object is to provide a means for regulating the speed of the drum to correspond with the diameter of the woven roll of fencing thereon—that is to say, as the diameter of the roll increases the distance of travel between stops of the roll will be proportionately reduced to make the length of wires drawn through the twisters uniform between the stops at which intervals the twisting is done. This part of my invention is the same as is shown and described in my application for patent for a wire-fence machine filed June 16, 1902, Serial No. 111,838.

I accomplish the objects of the invention by the mechanism illustrated in the accompanying drawings, in which—

Figure 1 is a view in side elevation of a fence-weaving machine having my improvements; Fig. 2, a detail in front view of the main driving-shaft and speed-regulating mechanism; Fig. 3, a detail in cross-section of the driving-shaft on the line 3 3 of Fig. 2 looking in the direction of the arrows; Fig. 4, a section on the line 4 4 of Fig. 3; Fig. 5, a section on the line 5 5 of Fig. 3; Fig. 6, a section on the line 6 6 of Fig. 2; Fig. 7, a longitudinal central section of the drum on which the woven product is reeled, and Fig. 8 a transverse section on the line 8 8 of Fig. 7. The views in all of the above sections are in the directions of the arrows accompanying the dotted lines, which indicate the lines of section.

Like characters of reference indicate like parts throughout the several views of the drawings.

1 represents the frame of the machine.

2 and 3 are shaft-stubs mounted in suitable boxes on either side of the machine. Mounted on the stub 2 is the sprocket-wheel 4, having an inner hub end forming a half-clutch 5, at the center of which is a toe 6. Between the clutch-half and the sprocket-wheel is a disk 7. The opposite stub 3 has a longitudinal sliding movement controlled by a lever 8 on the outside of the machine.

9 is the drum-shaft, having a socket at one end to receive the toe 6. The same end of the shaft has the hub 10, the outer end of which has a projecting clutch-half which mates with the clutch-half 5. At the opposite end of the shaft 9 is the hub 11, which projects beyond the end of the shaft to form a socket into which the stub 3 takes, as shown, to support the drum. This hub has a disk 12 similar to the disk 7. Between the hubs 10 and 11 are the two hubs 13, and all four of these hubs give support to a plurality of bifurcated lugs or arms 14, (here shown as six for each hub,) which form hinge-bearings for links 15, which are pivoted thereto by suitable bolts, as shown. The outer ends of the links are pivotally secured to the channel-bars 16. The woven-wire product of the machine is wound upon these channel-bars, which provide a folding or collapsible drum. The drum is inserted in the machine in its folded condition; but when its shaft is moved toward the clutch by the stub 3 the bars 16, bearing against the disk 7, cannot move longitudinally, but by the action of the links 15 will move laterally, thereby increasing the diameter of the drum. The disk 12 keeps the bars 16 from swinging back toward that end of the drum. When a sufficient quantity of product is reeled upon the drum, the latter is readily removed from the machine and the product removed from the drum by collapsing the latter.

17 is the main or driving shaft of the machine. It has the pulley 18, which is driven by belt 19 from any suitable motor.

20 is a parallel shaft below 17, which is driven continuously from the latter by cog-wheels 21 and 22.

Mounted loosely inside the frame of the machine on shaft 20 is the sprocket-wheel 23, which is connected by link belt 24 with the sprocket-wheel 4.

25 is the woven fence material produced by the machine. After leaving the wire-twisters (not shown) it passes under the drum 26, thence up and over the drum 27 at the top of the machine-frame, and thence down to and is reeled upon the drum on shaft 9.

The shaft 28, carrying the drum 27 at the top of the frame, has the notched wheel 29.

A lever 30, pivoted to the machine-frame, has a bent upper end which enters one of the notches of wheel 29 and holds it from turning until the lever is disengaged. The lower arm of the lever extends down in the path of a pin 31 on a continuously-revolving disk 32, mounted on the shaft 20, Figs. 1 and 2. It has a lug 33, which engages the teeth of a ratchet-wheel 34, loosely mounted on the shaft 17. At each revolution of the pin 31 the lever will be moved so as to liberate the wheel 29 and the wheel 34. By the side of the ratchet-wheel 34 is a ratchet-wheel 35, having teeth in a reverse order to those of wheel 34. The adjacent faces of these two wheels have opposite depressions 36 and 37. The wheel 35 has a lug 38, which extends into the depression in the wheel 34, and the wheel 34 has a lug 39, which extends into the depression in the wheel 35. A spring 40 is secured to lug 38 and bears at its opposite end against the lug 39. The lugs compel the two wheels to move together in a forward direction, and the spring allows one wheel to move back or in a reverse direction for a limited distance and then brings them back when released, with the spring-pressed lug against the end of the depression. The wheel 35 has an integral pinion 41, which engages a large spur gear-wheel 42 mounted loosely on shaft 20. Integral with wheel 42 is the sprocket-wheel 23, from which the wheel 4 on the reeling-drum is driven.

Mounted in a fixed manner on the shaft 17 is the disk 43, having a plurality of lugs 44 (here shown as four) projecting from its side toward the wheel 34. These lugs are provided with rollers, as shown in the drawings at 45. Pivoted to the adjacent side of wheel 34 is a lever 46, having a head 47 much thicker than the opposite arm 48 of the lever. The lever has a limited movement controlled by the pin 49, which allows the head of the lever to be thrown outwardly into the path of the lugs 44 of disk 43, and when one of the lugs strikes the head of the lever it and the wheel 35, to which it is attached, are carried around with the disk 43. This sets in motion the pinion 41, which drives wheel 42. The sprocket-wheel 23 through belt 24 drives the wheel 4, and the latter rotates the drum on which the wire fence is reeled. When the head 47 is thrown back toward the hub of the wheel, the lugs will pass freely over the thin portion 48 of the lever. Normally the lug 33 of the lever 30 is in engagement with the teeth of the wheel 34, and the wheel 35 is held from moving by a pawl 50. The moment the lever is moved by the pin 31 so as to release the wheel 34 the spring 40 will move the wheel 35 so as to cause the pin 49, which is carried by the wheel 34 and passes through slot 51 of lever 46, to move said lever 46 into the position shown in Fig. 3, with the head 47 in the path of lugs 44. The lugs through the mechanism described will drive the reeling-drum until the upper end of the lever 30 drops into the next lug of the wheel 29, whereupon the reeling operation will be stopped, and therewith the drawing of the wire through the twisters stopped. The length of wires drawn through the twisters before the twists are made will be controlled by the distance between the notches in the wheel 29. This will be varied by changing the wheel 29 and substituting wheels differently notched.

In order to get a firm bearing for lever 46, I prefer to provide the opening 53 in wheel 34 and allow the additionally-thickened head 47 to extend through the wheel 34 to the wheel 35, in which the pin 52 is seated. The pin 52 is the pivot about which the lever 46 moves and by means of which said lever is retained in position.

Having thus fully described my invention, what I claim as new, and wish to secure by Letters Patent of the United States, is—

1. In a drum for reeling up the finished product of a fence-weaving machine, a shaft having an end socket and radial links pivotally secured thereto, a plurality of bars pivotally secured to the links at equal distances from the first pivots, and means for holding the parallel bars at greater than minimum distance from the shaft during the operation of reeling up the fence, comprising a fixed disk having a toe to enter the socket in the shaft, a hub mounted on the opposite end of the shaft, said hub having a second disk and having a socket in the outer hub end, and a longitudinally-adjustable shaft-stub to enter the hub-socket.

2. In a reel, a central shaft, a plurality of bars hinged to the shaft equidistant from each other around the shaft and having together simultaneous and equal adjustments to and from the shaft always parallel in position therewith, and a pair of disks adjustable in distance from each other, between which said bars are mounted for holding the bars in an expanded position.

3. In a fence-machine, a removable shaft, means for moving it longitudinally, hubs mounted on the shaft, links pivoted radially to said hubs, bars parallel with the shaft secured pivotally to the links, said links being adapted to swing in one direction to change the distance of the bars from the shaft, a revoluble bearing-disk 7 mounted in a fixed position to arrest the bars and cause them to move laterally of the shaft when the shaft is moved longitudinally toward said bearing, stops to arrest the parts at a predetermined adjustment of same and a pivoted lever to longitudinally move the shaft.

4. In a reeling device, a reeling-drum, a second drum over which the material passes before reaching the reeling-drum, a notched wheel mounted on the shaft on which the second drum is mounted, an escapement-lever engaging the notches of said wheel, a driving-shaft, means actuated by said driving-shaft for moving the lever to release the wheel, and means for rotating the reeling-drum upon said release until the notched wheel is stopped by the escapement-lever entering its next notch.

5. In a reeling device, a reeling-drum having a sprocket-wheel, a second drum over which the material passes before reaching the reeling-drum, a notched wheel mounted on the shaft on which the second drum is mounted, an escapement-lever engaging the notches of said wheel, a constantly-rotating driving-shaft having a loose pinion and a fixed disk, a second continuously-rotating shaft having a loose sprocket-wheel integral with a cog-wheel which engages the pinion of the driving-shaft, a belt connecting the sprocket-wheel of the reeling-drum with the sprocket-wheel of the second shaft, means on the driving-shaft whereby the escapement-lever will hold the loose pinion in immovable position, means when the escapement-lever is withdrawn so as to release the pinion for making driving connection between the loose pinion and the fixed disk on the driving-shaft, and means on the second shaft for releasing the escapement-lever.

6. In a governor mechanism for reels, a drum over which the material to be reeled is passed, a notched wheel rotating with the drum, an escapement-lever engaging the notched wheel, said lever having a lug, a continuously-rotating driving-shaft, a loose pinion and a fixed disk mounted on said shaft, said disk having lateral lugs on the side adjacent to the pinion, a ratchet-wheel integral with the pinion, a pawl to engage the teeth of the ratchet-wheel, a second ratchet-wheel with teeth the reverse of those on the first wheel, said teeth being engaged by the lug on the escapement-lever, an elastic connection between the two ratchet-wheels, a bent lever pivoted to the first ratchet-wheel but extending through an opening in said second ratchet-wheel and adapted to be brought into engagement with a lateral lug of the fixed disk when the inner end of the lever is moved away from the driving-shaft, said lever having a slot and a pin in the second wheel taking into said slot, a second shaft having a cog-wheel the teeth of which engage the teeth of the pinion, said cog-wheel having an integral sprocket-wheel, and means for releasing the escapement-lever from the second ratchet-wheel.

7. In a reeling device, a drum on which the material is wound, means for rotating the drum, a second drum around which the material is passed before reaching the reeling-drum, means whereby the second drum will be stopped when a predetermined length of material has passed around it, and means for stopping the first drum by the stopping of the second drum.

In witness whereof I have hereunto set my hand and seal, at Indianapolis, Indiana, this 27th day of June, A. D. 1902.

GEORGE W. WHITTINGTON. [L. S.]

Witnesses:
JOSEPH A. MINTURN,
S. MAHLON UNGER.